United States Patent
Le Coent

(10) Patent No.: US 7,951,760 B2
(45) Date of Patent: May 31, 2011

(54) OVERBASED ALKALI METAL ALKYLHYDROXYBENZOATES HAVING LOW CRUDE SEDIMENT

(75) Inventor: Jean-Louis Le Coent, Le Havre (FR)

(73) Assignee: Chevron Oronite S.A., Levallois-Perret (FR)

( * ) Notice: Subject to any disclaimer, the term of this patent is extended or adjusted under 35 U.S.C. 154(b) by 1477 days.

(21) Appl. No.: 11/193,247

(22) Filed: Jul. 29, 2005

(65) Prior Publication Data

US 2007/0027044 A1 Feb. 1, 2007

(51) Int. Cl.
*C10M 159/22* (2006.01)

(52) U.S. Cl. ...................................... 508/460

(58) Field of Classification Search .................... 508/460
See application file for complete search history.

(56) References Cited

U.S. PATENT DOCUMENTS

| 3,397,971 | A | * | 8/1968 | van der Minne et al. ....... 44/364 |
| 3,410,798 | A | * | 11/1968 | Cohen ........................... 508/460 |
| 5,677,270 | A | * | 10/1997 | Small et al. ................... 508/574 |
| 5,895,777 | A | | 4/1999 | Ueda et al. |
| 6,090,759 | A | * | 7/2000 | Cane et al. ..................... 508/460 |
| 2004/0068921 | A1 | * | 4/2004 | Caprotti et al. ................. 44/363 |
| 2004/0235686 | A1 | * | 11/2004 | Boons et al. ................... 508/460 |

FOREIGN PATENT DOCUMENTS

| BR | 734622 | 2/1953 |
| BR | 734598 | 8/1955 |
| BR | 738359 | 10/1955 |
| BR | 786167 | 11/1957 |
| BR | 1146925 | 3/1969 |
| EP | 1154012 | 11/2001 |

* cited by examiner

*Primary Examiner* — Glenn A Caldarola
*Assistant Examiner* — Taiwo Oladapo

(57) ABSTRACT

A process for preparing an overbased alkali metal alkylhydroxybenzoate, said process comprising overbasing an alkali metal alkylhydroxybenzoate or a mixture of alkali metal alkylhydroxybenzoate and up to 50 mole % of alkylphenol, based on the total mixture of alkylhydroxybenzoate and alkylphenol, with a molar excess of alkaline earth metal base and at least one acidic overbasing material in the presence of at least one carboxylic acid having from one to four carbon atoms and a solvent selected from the group consisting of aromatic hydrocarbons, aliphatic hydrocarbons, monoalcohols and mixtures thereof.

104 Claims, No Drawings

OVERBASED ALKALI METAL ALKYLHYDROXYBENZOATES HAVING LOW CRUDE SEDIMENT

The present invention relates to a process for the preparation of novel detergent-dispersant additives for lubricating oil applications for internal combustion engines. In particular, the process of the present invention provides middle to high TBN detergent-dispersant additives having very low crude sediment that when used in a lubricating oil composition is highly effective for the lubrication of mechanical components in land and marine engines.

BACKGROUND OF THE INVENTION

Overbased detergents are well described to provide lubricating properties. Often such detergent additives are proportioned with other lubricating additives to provide lubricating oil compositions that exhibit certain desired lubricating properties.

Alkaline-earth metal hydroxybenzoates are also known as additives for engine lubricating oils.

U.S. Pat. No. 5,895,777 describes lubricating oil additives comprising the alkaline-earth metal salts of aromatic carboxylic hydroxy acids containing carboxylic acids having 16 to 36 carbon atoms.

European Patent Application No. 1,154,012 describes lubricating compositions comprising an oil, an anti-wear additive and a sole oil-soluble overbased detergent comprising an aromatic carboxylate, such as a calcium salicylate substituted by a hydrocarbon remainder.

British Patent No. 1,146,925 describes lubricating compositions comprising, as lubricating agents, polyvalent metal salts, in particular calcium, and alkylsalicylic acids comprising more than 12, preferably 14 to 18 carbon atoms in the alkyl group. These salts can be prepared from the corresponding sodium salts, as synthesis intermediates.

British Patent No. 786,167 describes polyvalent metal salts of oil-soluble organic acids, such as sulfonic hydrocarbons, naphthenic acids or alkylhydroxybenzoic acids, in particular alkylsalicylic acids having an alkyl radical of up to 22 carbon atoms. The alkylsalicylic acids can be prepared from sodium alkylsalicylic acids according to the processes described in British Patents Nos. 734,598; 734,622 and 738,359. The sodium alkylsalicylates described in these British patents are useful as synthetic intermediates for the preparation of alkaline-earth alkylsalicylates, which are also useful as additives for lubricating oil.

In general, the above references describe processes for aromatic hydroxy carboxylic acids and their salts which are derived from alkaline salts of phenol derivatives, such as phenol itself, cresols, mono- and dialkylphenols, the alkyl group having from about 8 to 18 carbon atoms, halogenated phenols, aminophenols, nitrophenols, 1-naphthol, 2-naphthol, halogenated naphthols, and the like. The processes described above, however, lead to products having high sediment content at high TBN that decrease product yield and create added disposal expense. Thus, it is desirable to have a process that improves product yield by minimizing the sediment resulting from such processes.

SUMMARY OF THE INVENTION

The present invention provides middle to high overbased detergent-dispersant additives as lubricating oil additives effective for the lubrication of mechanical components in land and marine engines, such as, for example, hydraulic systems, transmissions, two-stroke and four-stroke vehicular engines, trunk piston and two stroke crosshead marine engines.

Accordingly, the present invention relates to a process for the preparation of novel detergent-dispersant additives having low crude sediment. More particularly, the present invention relates to a process for the preparation of overbased alkali metal alkylhydroxybenzoates, characterized in that the crude sediment is less than 3 volume % preferably less than 2 volume % and more preferably less than 1 volume %.

In one embodiment, the present invention relates to a process for preparing an overbased alkali metal alkylhydroxybenzoate comprising overbasing an alkali metal alkylhydroxybenzoate or a mixture of alkali metal alkylhydroxybenzoate and up to 50 mole % of alkylphenol, based on the total mixture of alkylhydroxybenzoate and alkylphenol, with a molar excess of alkaline earth metal base and at least one acidic overbasing material in the presence of at least one carboxylic acid having from one to four carbon atoms and a solvent selected from the group consisting of aromatic hydrocarbons, aliphatic hydrocarbons, monoalcohols, and mixtures thereof.

In another embodiment, the present invention relates to a process for preparing an overbased alkali metal alkylhydroxybenzoate obtained by the process comprising:
  a) Reacting alkylphenol with an alkali metal base to produce an alkali metal alkylphenate;
  b) Carboxylating the alkali metal alkylphenate obtained in step a) with carbon dioxide so that at least 50 mole % of the starting alkylphenol has been converted to an alkali metal alkylhydroxybenzoate;
  c) Contacting the alkali metal alkylhydroxybenzoate in step b) with at least one carboxylic acid having from about one to four carbon atoms; and
  d) Overbasing the mixture of the alkali metal alkylhydroxybenzoate and the at least one carboxylic acid having about one to four carbon atoms from step c) with a molar excess of alkaline earth metal base and at least one acidic overbasing material in the presence of a solvent selected from the group consisting of aromatic hydrocarbons, aliphatic hydrocarbons, monoalcohols, and mixtures thereof.

In yet another embodiment, the present invention relates to a process for preparing an overbased alkali metal alkylhydroxybenzoate obtained by the process comprising:
  a) Reacting alkylphenol with an alkali metal base to produce an alkali metal alkylphenate;
  b) Carboxylating the alkali metal alkylphenate obtained in step a) with carbon dioxide so that at least 50 mole % of the starting alkylphenol has been converted to an alkali metal alkylhydroxybenzoate;
  c) Contacting the alkali metal alkylhydroxybenzoate with a molar excess of alkaline earth metal base and a solvent selected from the group consisting of aromatic hydrocarbons, aliphatic hydrocarbons, monoalcohols, and mixtures thereof;
  d) Contacting the mixture of alkali metal alkylhydroxybenzoate and molar excess of alkaline earth metal base and the solvent from step c) with at least one carboxylic acid having from about one to four carbon atoms; and
  e) Overbasing the mixture of alkali metal alkylhydroxybenzoate, the molar excess of alkaline earth metal base, the solvent and the at least one carboxylic acid having from about one to four carbon atoms from step d) with an acidic overbasing material.

The present invention is also directed to overbased alkali earth metal alkylhydroxybenzoates produced by the processes of the present invention described above.

Further, the present invention also relates to a lubricating oil composition comprising a major amount of a base oil of lubricating viscosity and a minor amount of the overbased alkali metal alkylhydroxybenzoate prepared by the processes described above.

Among other factors, the present invention is based on the surprising discovery that middle to high overbased alkali metal alkylhydroxylbenzoates obtained with a process of contacting at least one carboxylic acid having from about one to four carbon atoms with an alkali metal alkylhydroxybenzoate or a mixture of an alkali metal alkylhydroxylbenzoates and up to 50 mole % of alkylphenol can lead to a very low amounts of crude sediments compared to a process without the use of the carboxylic acid. The detergent-dispersant additives prepared by the process of the present invention have improved low temperature viscosity and are effective for the lubrication of mechanical components in land and marine engines, such as for example, hydraulic systems, transmissions, two-stroke and four-stroke vehicular engines, trunk piston and two-stroke crosshead marine engines. In particular, the detergent-dispersant additives of the present invention are useful for improving pumpability at low temperature in automotive formulations. The process of the present invention also significantly decreases the level of waste since lower crude sediments are produced which effectively lowers the cost of production.

DETAILED DESCRIPTION OF THE INVENTION

Prior to discussing the present invention in detail, the following terms will have the following meanings unless expressly stated to the contrary.

Definitions

The term "alkali metal" or "alkaline metal" refers to lithium, sodium or potassium.

The term "alkaline earth metal" refers to calcium, barium, magnesium and strontium.

The term "alkyl" refers to both straight- and branched-chain alkyl groups.

The term "alkylphenate" means a metal salt of an alkylphenol.

The term "alkylphenol" means a phenol having one or more alkyl substituents, wherein at least one of the alkyl substituents has a sufficient number of carbon atoms to impart oil solubility to the phenol.

The term "aryl group" is a substituted or non-substituted aromatic group, such as the phenyl, tolyl, xylyl, ethylphenyl and cumenyl groups.

The term "calcium base" refers to a calcium hydroxide, calcium oxide, calcium alkoxides, and the like, and mixtures thereof.

The term "hydrocarbyl" means an alkyl or alkenyl group.

The term "hydrocarbyl phenol" refers to a phenol having one or more hydrocarbyl substituent; at least one of which has sufficient number of carbon atoms to impart oil solubility to the phenol.

The term "lime" refers to calcium hydroxide, also known as slaked lime or hydrated lime.

The term "metal" means alkali metals, alkaline earth metals, or mixtures thereof.

The term "metal base" refers to a metal hydroxide, metal oxide, metal alkoxides and the like and mixtures thereof, wherein the metal is selected from the group consisting of lithium, sodium, potassium, magnesium, calcium, strontium, barium or mixtures thereof.

The term "overbased" refers to a class of metal salts or complexes. These materials have also been referred to as "basic", "superbased", "hyperbased", "complexes", "metal complexes", "high-metal containing salts", and the like. Overbased products are metal salts or complexes characterized by a metal content in excess of that which would be present according to the stoichiometry of the metal and the particular acidic organic compound reacted with the metal, e.g., a carboxylic acid.

The term "phenate" means a metal salt of a phenol.

The term "Total Base Number" or "TBN" refers to the equivalent number of milligrams of KOH needed to neutralize 1 gram of a product. Therefore, a high TBN reflects strongly overbased products and, as a result, a higher base reserve for neutralizing acids. The TBN of a product can be determined by ASTM Standard No. D2896 or equivalent procedure.

Overbased Alkali Metal Alkylhydroxybenzoate

The overbased alkali metal alkylhydroxybenzoates of the present invention will typically have a structure as shown below as Formula (I).

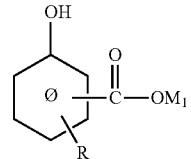

Formula I wherein R is a linear aliphatic group, branched aliphatic group or a mixture of linear and branched aliphatic groups. Preferably, R is an alkyl or alkenyl group. More preferably, R is an alkyl group.

$M_1$ is an alkali metal base preferably potassium or sodium.

When R is a linear aliphatic group, the linear alkyl group typically comprises from about 12 to 40 carbon atoms, more preferably from about 18 to 30 carbon atoms.

When R is a branched aliphatic group, it typically comprises at least 9 carbon atoms, preferably from about 9 to 40 carbon atoms, more preferably from about 9 to 24 carbon atoms and most preferably from about 10 to 18 carbon atoms. Such branched aliphatic groups are preferably derived from an oligomer of propylene or butene.

R can also represent a mixture of linear or branched aliphatic groups. Preferably, R represents a mixture of linear alkyl containing from about 20 to 30 carbon atoms and branched alkyl containing about 12 carbon atoms.

When R represents a mixture of aliphatic groups, the alkali metal base alkylhydroxybenzoic acid employed in the present invention may contain a mixture of linear groups, a mixture of branched groups, or a mixture of linear and branched groups. Thus, R can be a mixture of linear aliphatic groups, preferably alkyl, for example, an alkyl group selected from the group consisting of $C_{14}$-$C_{16}$, $C_{16}$-$C_{18}$, $C_{18}$-$C_{20}$, $C_{20}$-$C_{22}$, $C_{20}$-$C_{24}$ and $C_{20}$-$C_{28}$ alkyl and mixtures thereof, and is derived from normal alpha olefins. Advantageously, these mixtures include at least 95 mole %, preferably 98 mole % of alkyl groups.

The alkali metal base alkylhydroxybenzoic acid of the present invention wherein R represents a mixture of alkyl groups, can be prepared from linear alpha olefin cuts, such as those marketed by Chevron Phillips Chemical Company under the names Normal Alpha Olefin $C_{26}$-$C_{28}$ or Normal Alpha Olefin $C_{20}$-$C_{24}$, by British Petroleum under the name $C_{20}$-$C_{26}$ Olefin, by Shell Chimie under the name SHOP C20-22, or mixtures of these cuts or olefins from these companies having from about 20 to 28 carbon atoms.

The —COOM group of Formula I can be in the ortho, meta or para position with respect to the hydroxyl group.

The alkali metal base alkylhydroxybenzoic acid of the present invention can be any mixture of alkali metal alkylhydroxybenzoic acid having the —COOM group in the ortho, meta or para position.

The alkali metal base alkylhydroxybenzoates of the present invention are generally soluble in oil as characterized by the following test.

A mixture of a 600 Neutral diluent oil and the alkylhydroxybenzoate at a content of 10 volume % with respect to the total weight of the mixture is centrifuged at a temperature of 60° C. and for 30 minutes, the centrifugation being carried out under the conditions stipulated by the standard ASTM D2273 (it should be noted that centrifugation is carried out without dilution, i.e. without adding solvent); immediately after centrifugation, the volume of the deposit which forms is determined; if the deposit is less than 0.05% v/v (volume of the deposit with respect to the volume of the mixture), the product is considered as soluble in oil.

Advantageously, the TBN of the high overbased alkali metal alkyhydroxybenzoate of the present invention is greater than 250, preferably from about 250 to 450 and more preferably from about 300 to 400 and will generally have less than 3 volume %, preferably less than 2 volume % and more preferably less than 1 volume % crude sediment. For the middle overbased alkali metal alkylhydroxybenzoate of the present invention, the TBN is from about 100 to 250, preferably from about 140 to 230 and will generally have less than 1 volume %, preferably less than 0.5 volume % crude sediment.

Process

In the first embodiment of the present invention, the process for preparing the overbased alkali metal alkylhydroxybenzoate involves overbasing the alkali metal alkylhydroxylbenzoate or a mixture of alkali metal alkylhydroxylbenzoate and up to 50 mole % of alkylphenol, based on the total mixture of alkylhydroxybenzoate and alkylphenol, with a molar excess of alkali metal base and at least one acidic overbasing material in presence of at least one carboxylic acid having from one to four carbon atoms and a solvent selected form the group consisting of aromatic hydrocarbons, aliphatic hydrocarbons, monoalcohols, and mixtures thereof.

Overbasing of the alkali metal alkylhydroxybenzoate or mixture of alkali metal alkylhydroxybenzoate and alkylphenol may be carried out by any method known by a person skilled in the art to produce overbased alkali metal alkylhydroxybenzoates. However, it has been surprisingly discovered that the addition of a small quantity of $C_1$-$C_4$ carboxylic acid at this step decreases the crude sediment obtained at the end of overbasing step by a factor of at least 3.

The $C_1$-$C_4$ carboxylic acids used in the neutralization step include formic acid, acetic acid, propionic acid, and butyric acid, which may be used alone or in mixture. It is preferable to use mixtures of such acids as, for example, formic acid:acetic acid, in a molar ratio of formic acid:acetic acid of from about 0.1:1 to 100:1, preferably from about 0.5:1 to 4:1, more preferably from about 0.5:1 to 2:1 and most preferably about 1:1.

Generally, the overbasing reaction is carried out in a reactor in the presence of alkylhydroxybenzoic acid from about 10 wt % to 70 wt %, alkylphenol from about 1 wt % to 30 wt %, diluent oil from about 0 wt % to 40 wt %, an aromatic solvent from about 20 wt % to 60 wt %. The reaction mixture is agitated. The alkaline earth metal associated with an aromatic solvent, a monoalcohol and carbon dioxide are added to the reaction while maintaining the temperature between about 20° C. and 80° C.

The degree of overbasing may be controlled by the quantity of the alkaline earth metal, carbon dioxide and the reactants added to the reaction mixture and the reaction conditions used during the carbonation process.

The weight ratios of reagents used (methanol, xylene, slaked lime and $CO_2$) will correspond to the following weight ratios:

Xylene:slaked lime from about 1.5:1 to 7:1, preferably from about 2:1 to 4:1.

Methanol:slaked lime from about 0.25:1 to 4:1, preferably from about 0.4:1 to 1.2:1.

Carbon dioxide:slaked lime from a molar ratio about 0.5:1 to 1.3:1, preferably from about 0.7:1 to 1.0:1.

$C_1$-$C_4$ carboxylic acid:alkylhydroxybenzoic acid a molar ratio from about 0.02:1 to 1.5:1, preferably from about 0.1:1 to 0.7:1.

Lime is added as a slurry. i.e., as a pre-mixture of lime, methanol, xylene, and $CO_2$ is introduced over a period of 1 hour to 4 hours, at a temperature between about 20° C. and 65° C.

The quantity of lime and $CO_2$ are adjusted in order to obtain a high overbased material (TBN>250) and crude sediment in the range of 0.4 to 3 volume %, preferably in the range of 0.6 to 1.8 volume %, without any deterioration of the performance. With the omission of $C_1$-$C_4$ carboxylic acid, it is not able to reach this low level of crude sediment. Typically, crude sediment without a $C_1$-$C_4$ carboxylic acid will range from about 4 to 8 volume %.

For a middle overbased material (TBN from about 100 to 250), the quantity of lime and $CO_2$ are adjusted in order to obtain a crude sediment in the range of 0.2 to 1 volume %. The crude sediment without the use of $C_1$-$C_4$ carboxylic acid will range from about 0.8 to 3 volume %.

In a second embodiment of the present invention, the overbased alkali metal alkylhydroxybenzoate may be prepared by the following steps:

A. Formation of the Alkali Metal Base Alkylphenate:

In the first step, alkylphenols are neutralized using an alkali metal base preferably in the presence of a light solvent, such as toluene, xylene isomers, light alkylbenzene or the like, to form the alkali metal base alkylphenate. In one embodiment, the solvent forms an azeotrope with water. In another embodiment, the solvent may also be a mono-alcohol such as 2-ethylhexanol. In this case, the 2-ethylhexanol is eliminated by distillation before carboxylation. The objective with the solvent is to facilitate the elimination of water.

The hydrocarbyl phenols may contain up to 100 wt % linear hydrocarbyl groups, up to 100 wt % branched hydrocarbyl groups, or both linear and branched hydrocarbyl groups. Preferably, the linear hydrocarbyl group, if present, is alkyl, and the linear alkyl group typically contains from about 12 to 40 carbon atoms, more preferably from about 18 to 30 carbon atoms. The branched hydrocarbyl group, if present, is preferably alkyl and contains at least 9 carbon atoms, preferably from about 9 to 40 carbon atoms, more preferably from about 9 to 24 carbon atoms and most preferably from about 10 to 18 carbon atoms. In one embodiment, the hydrocarbyl phenols contain up to 85 wt % of linear hydrocarbyl phenol (preferably at least 35 wt % linear hydrocarbyl phenol) in mixture with at least 15 wt % of branched hydrocarbyl phenol.

The use of an alkylphenol containing up to at least 35 wt % of long linear alkylphenol (from about 18 to 30 carbon atoms) is particularly attractive because a long linear alkyl chain promotes the compatibility and solubility of the additives in lubricating oils.

Branched alkylphenols can be obtained by reaction of phenol with a branched olefin, generally originating from propylene.

They consist of a mixture of monosubstituted isomers, the great majority of the substituents being in the para position, very few being in the ortho position, and hardly any in the meta position.

On the other hand, linear alkylphenols can be obtained by reaction of phenol with a linear olefin, generally originating from ethylene. They consist of a mixture of monosubstituted isomers in which the proportion of linear alkyl substituents in the ortho, meta, and para positions is much more uniformly distributed. Of course, linear alkylphenols may contain alkyl substituents with some branching which increases the amount of para substituents and, resultantly may increase the relative reactivity towards alkali metal bases.

The alkali metal bases that can be used for carrying out this step include the oxides or hydroxides of lithium, sodium or potassium. In a preferred embodiment, potassium hydroxide is preferred. In another preferred embodiment, sodium hydroxide is preferred.

An objective of this step is to have an alkylphenate having less than 2000 ppm, preferably less than 1000 ppm and more preferably less than 500 ppm of water.

This operation is carried out at a temperature high enough to eliminate water. In one embodiment, the product is put under a slight vacuum in order to require a lower reaction temperature.

In one embodiment, xylene is used as a solvent and the reaction conducted at a temperature between 130° C. and 155° C., under an absolute pressure of 800 mbar ($8 \times 10^4$ Pa).

In another embodiment, 2-ethylhexanol is used as solvent. As the boiling point of 2-ethylhexanol (184° C.) is significantly higher than xylene (140° C.), the reaction is conducted at a temperature of at least 150° C.

The pressure is reduced gradually below atmospheric in order to complete the distillation of water reaction. Preferably, the pressure is reduced to no more than 70 mbar ($7 \times 10^3$ Pa).

By providing that operations are carried out at a sufficiently high temperature and that the pressure in the reactor is reduced gradually below atmospheric, the neutralization reaction is carried out without the need to add a solvent and forms an azeotrope with the water formed during this reaction). In this case, temperature is heated up to 200° C. and then the pressure is reduced gradually below atmospheric. Preferably the pressure is reduced to no more than 70 mbar ($7 \times 10^3$ Pa).

Elimination of water is done over a period of at least 1 hour, preferably at least 3 hours.

The quantities of reagents used should correspond to the following molar ratios:
alkali metal base:alkylphenol from about 0.5:1 to 1.2:1, preferably from about: 0.9:1 to 1.05:1
solvent:alkylphenol (vol:vol) from about 0.1:1 to 5:1, preferably from about 0.3:1 to 3:1

B. Carboxylation:

This carboxylation step is conducted by simply bubbling carbon dioxide ($CO_2$) into the reaction medium originating from the preceding neutralization step and is continued until at least 50% of the starting alkylphenol has been converted to alkylhydroxybenzoic acid (measured as hydroxybenzoic acid by potentiometric determination).

At least 50 mole %, preferably 75 mole %, more preferably 85 mole % of the starting alkylphenol is converted to alkylhydroxylbenzoate using carbon dioxide at a temperature between about 110° C. and 200° C. under a pressure within the range of from about atmospheric to 15 bar ($15 \times 10^5$ Pa), preferably from 1 bar ($1 \times 10^5$ Pa) to 5 bar ($5 \times 10^5$ Pa), for a period between about 1 and 8 hours.

In one variant with potassium salt, temperature is preferably between about 125° C. and 165° C. and more preferably between 130° C. and 155° C., and the pressure is from about atmospheric to 15 bar ($15 \times 10^5$ Pa), preferably from about atmospheric to 4 bar ($4 \times 10^5$ Pa).

In another variant with sodium salt, temperature is directionally lower preferably between from about 110° C. and 155° C. More preferably from about 120° C. and 140° C. and the pressure from about 1 bar to 20 bar ($1 \times 10^5$ to $20 \times 10^5$ Pa), preferably from 3 bar to 15 bar ($3 \times 10^5$ to $15 \times 10^5$ Pa).

The carboxylation is usually carried out, diluted in a solvent such as hydrocarbons or alkylate, e.g., benzene, toluene, xylene and the like. In this case, the weight ratio of solvent: hydroxybenzoate is from about 0.1:1 to 5:1, preferably from about 0.3:1 to 3:1.

In another variant, no solvent is used. In this case, carboxylation is conducted in the presence of diluent oil in order to avoid a too viscous material.

The weight ratio of diluent oil:alkylhydroxybenzoate is from about 0.1:1 to 2:1, preferably from about 0.2:1 to 1:1 and more preferably from about 0.2:1 to 0.5:1.

C. Contact with Carboxylic Acid:

The alkali metal alkylhydroxybenzoate in step (B) is contacted with at least one carboxylic acid having from about one to four carbon atoms.

D. Overbasing:

Overbasing of the alkali metal alkylhydroxybenzoate or mixture of alkali metal alkylhydroxybenzoate and alkylphenol may be carried out by any method known by a person skilled in the art to produce overbased alkali metal alkylhydroxybenzoates. However, it has been surprisingly discovered that the addition of a small quantity of $C_1$-$C_4$ carboxylic acid at this step decreases the crude sediment obtained at the end of overbasing step by a factor of at least 3.

The $C_1$-$C_4$ carboxylic acids used in the neutralization step include formic acid, acetic acid, propionic acid and butyric acid, which may be used alone or in mixture. It is preferable to use mixtures of such acids as, for example, formic acid: acetic acid, in a molar ratio of formic acid:acetic acid of from about 0.1:1 to 100:1, preferably from about 0.5:1 to 4:1, more preferably from about 0.5:1 to 2:1, and most preferably about 1:1.

Generally, the overbasing reaction is carried out in a reactor in the presence of alkali metal base alkylhydroxybenzoate from about 10 wt % to 70 wt %, alkylphenol from about 1 wt % to 30 wt %, diluent oil from about 0% to 40%, an aromatic solvent from about 20 wt % to 60 wt %. The reaction mixture is agitated. The alkali metal associated with an aromatic solvent and a monoalcohol, a small quantity of $C_1$-$C_4$ carboxylic acid and carbon dioxide are added to the reaction while maintaining the temperature between about 20° C. and 80° C.

The degree of overbasing may be controlled by the quantity of the alkaline earth metal, carbon dioxide and the reactants added to the reaction mixture and the reaction conditions used during the carbonation process.

The weight ratios of reagents used (methanol, xylene, slaked lime and $CO_2$) will correspond to the following weight ratios:
- Xylene:slaked lime from about 1.5:1 to 7:1, preferably from about 2:1 to 4:1.
- Methanol:slaked lime from about 0.25:1 to 4:1, preferably from about 0.4:1 to 1.2:1.
- Carbon dioxide:slaked lime from a molar ratio about 0.5:1 to 1.3:1, preferably from about 0.7:1 to 1.0:1.
- $C_1$-$C_4$ carboxylic acid: alkaline metal base alkylhydroxybenzoate a molar ratio from about 0.02:1 to 1.5:1, preferably from about 0.1:1 to 0.7:1.

Lime is added as a slurry. i.e., as a pre-mixture of lime, methanol, xylene, and $CO_2$ is introduced over a period of 1 hour to 4 hours, at a temperature between about 20° C. and 65° C.

The quantity of lime and $CO_2$ are adjusted in order to obtain for a high overbased material (TBN>250) and crude sediment in the range of 0.4 volume % to 3 volume %, preferably in the range of 0.6 volume % to 1.8 volume %, without any deterioration of the performance. With the omission of $C_1$-$C_4$ carboxylic acid, it is not able to reach this low level of crude sediment. Typically, crude sediment without a $C_1$-$C_4$ carboxylic acid will range from about 4 volume % to 8 volume %.

For a middle overbased material (TBN from 100 to 250), the quantity of lime and $CO_2$ are adjusted in order to obtain a crude sediment in the range of 0.2 volume % to 1 volume %. The crude sediment without the use of $C_1$-$C_4$ carboxylic acid will range from about 0.8 volume % to 3 volume %.

In the third embodiment of the present invention, the overbased alkali metal alkylhydroxybenzoate may be obtained by a process having steps A and B above followed by:

C. Contacting with Alkaline Earth Metal Base and Solvent:

Contacting the alkali metal alkylhydroxybenzoate with a molar excess of alkaline earth metal base and a solvent selected from the group consisting of aromatic hydrocarbons, aliphatic hydrocarbons, monoalcohols, and mixtures thereof.

Contacting the mixture of alkali metal alkylhydroxybenzoate and molar excess of alkaline earth metal base and the solvent from step C with at least one carboxylic acid having from about one to four carbon atoms.

D. Overbasing:

The alkali metal alkylhydroxybenzoate is then overbased according to the description provided above.

Optionally, for each of the processes described above, predistillation, centrifugation and distillation may be utilized to remove solvent and crude sediment. Water, methanol and a portion of the xylene may be eliminated by heating between 110° C. to 134° C. This may be followed by centrifugation to eliminated unreacted lime. Finally, xylene may be eliminated by heating under vacuum in order to reach a flash point of at least about 160° C. as determined with the Pensky-Martens Closed Cup (PMCC) Tester described in ASTM D93.

Lubricating Oil Composition

The present invention also relates to lubricating oil compositions containing an overbased alkali metal alkylhydroxybenzoate prepared by the process of the present invention. Such lubricating oil compositions will comprise a major amount of a base oil of lubricating viscosity and a minor amount of an overbased alkali metal alkylhydroxybenzoate prepared by the process of the present invention having a TBN from about 250 to 450, preferably from about 300 to 400, and a crude sediment of less than about 3 volume %, preferably less than about 2 volume %, more preferably less than about 1 volume %, in the case of a high overbased alkali metal alkylhydroxybenzoate and in the case of a middle overbased alkali metal alkylhydroxybenzoate having a TBN from about 100 to 250, preferably from about 140 to 230, with a crude sediment of less than 1 volume % and preferably less than 0.5 volume %.

Base oil as used herein is defined as a base stock or blend of base stocks which is a lubricant component that is produced by a single manufacturer to the same specifications (independent of feed source or manufacturer's location); that meets the same manufacturer's specification; and that is identified by a unique formula, product identification number, or both. Base stocks may be manufactured using a variety of different processes including but not limited to distillation, solvent refining, hydrogen processing, oligomerization, esterification, and rerefining. Rerefined stock shall be substantially free from materials introduced through manufacturing, contamination, or previous use. The base oil of this invention may be any natural or synthetic lubricating base oil fraction particularly those having a kinematic viscosity at 100° Centigrade (C.) and about 4 centistokes (cSt) to about 20 cSt. Hydrocarbon synthetic oils may include, for example, oils prepared from the polymerization of ethylene, polyalphaolefin or PAO, or from hydrocarbon synthesis procedures using carbon monoxide and hydrogen gases such as in a Fisher-Tropsch process. A preferred base oil is one that comprises little, if any, heavy fraction; e.g., little, if any, lube oil fraction of viscosity about 20 cSt or higher at about 100 C. Oils used as the base oil will be selected or blended depending on the desired end use and the additives in the finished oil to give the desired grade of engine oil, e.g. a lubricating oil composition having an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40, 10W-50, 15W, 15W-20, 15W-30, or 15W-40.

The base oil may be derived from natural lubricating oils, synthetic lubricating oils or mixtures thereof. Suitable base oil includes base stocks obtained by isomerization of synthetic wax and slack wax, as well as hydrocrackate base stocks produced by hydrocracking (rather than solvent extracting) the aromatic and polar components of the crude. Suitable base oils include those in all API categories I, II, III, IV and V as defined in API Publication 1509, 14th Edition, Addendum I, December 1998. Saturates levels and viscosity indices for Group I, II and III base oils are listed in Table I. Group IV base oils are polyalphaolefins (PAO). Group V base oils include all other base oils not included in Group I, II, III, or IV. Group III base oils are preferred.

TABLE I

Saturates, Sulfur and Viscosity Index of Group I, II, III, IV and V Base Stocks

| Group | Saturates (As determined by ASTM D2007) Sulfur (As determined by ASTM D2270) | Viscosity Index (As determined by ASTM D4294, ASTM D4297 or ASTM D3120) |
|---|---|---|
| I | Less than 90% saturates and/or Greater than to 0.03% sulfur | Greater than or equal to 80 and less than 120 |

TABLE I-continued

Saturates, Sulfur and Viscosity Index of Group I, II, III, IV and V Base Stocks

| Group | Saturates (As determined by ASTM D2007) Sulfur (As determined by ASTM D2270) | Viscosity Index (As determined by ASTM D4294, ASTM D4297 or ASTM D3120) |
|---|---|---|
| II | Greater than or equal to 90% saturates and less than or equal to 0.03% sulfur | Greater than or equal to 80 and less than 120 |
| III | Greater than or equal to 90% saturates and less than or equal to 0.03% sulfur | Greater than or equal to 120 |
| IV | All Polyalphaolefins (PAOs) | |
| V | All others not included in Groups I, II, III, or IV | |

Natural lubricating oils may include animal oils, vegetable oils (e.g., rapeseed oils, castor oils and lard oil), petroleum oils, mineral oils, and oils derived from coal or shale.

Synthetic oils may include hydrocarbon oils and halo-substituted hydrocarbon oils such as polymerized and interpolymerized olefins, alkylbenzenes, polyphenyls, alkylated diphenyl ethers, alkylated diphenyl sulfides, as well as their derivatives, analogues and homologues thereof, and the like. Synthetic lubricating oils also include alkylene oxide polymers, interpolymers, copolymers and derivatives thereof wherein the terminal hydroxyl groups have been modified by esterification, etherification, etc. Another suitable class of synthetic lubricating oils comprises the esters of dicarboxylic acids with a variety of alcohols. Esters useful as synthetic oils also include those made from $C_5$ to $C_{12}$ monocarboxylic acids and polyols and polyol ethers. Tri-alkyl phosphate ester oils such as those exemplified by tri-n-butyl phosphate and tri-iso-butyl phosphate are also suitable for use as base oils.

Silicon-based oils (such as the polyalkyl-, polyaryl-, polyalkoxy-, or polyaryloxy-siloxane oils and silicate oils) comprise another useful class of synthetic lubricating oils. Other synthetic lubricating oils include liquid esters of phosphorus-containing acids, polymeric tetrahydrofurans, polyalphaolefins, and the like.

The base oil may be derived from unrefined, refined, rerefined oils, or mixtures thereof. Unrefined oils are obtained directly from a natural source or synthetic source (e.g., coal, shale, or tar sand bitumen) without further purification or treatment. Examples of unrefined oils include a shale oil obtained directly from a retorting operation, a petroleum oil obtained directly from distillation, or an ester oil obtained directly from an esterification process, each of which may then be used without further treatment. Refined oils are similar to the unrefined oils except that refined oils have been treated in one or more purification steps to improve one or more properties. Suitable purification techniques include distillation, hydrocracking, hydrotreating, dewaxing, solvent extraction, acid or base extraction, filtration, and percolation, all of which are known to those skilled in the art. Rerefined oils are obtained by treating used oils in processes similar to those used to obtain the refined oils. These rerefined oils are also known as reclaimed or reprocessed oils and often are additionally processed by techniques for removal of spent additives and oil breakdown products.

Base oil derived from the hydroisomerization of wax may also be used, either alone or in combination with the aforesaid natural and/or synthetic base oil. Such wax isomerate oil is produced by the hydroisomerization of natural or synthetic waxes or mixtures thereof over a hydroisomerization catalyst.

It is preferred to use a major amount of base oil in the lubricating oil composition of the present invention. A major amount of base oil as defined herein comprises 40 wt or more. Preferred amounts of base oil comprise from about 40 wt % 97 wt %, preferably greater than from about 50 wt % to 97 wt %, more preferably from about 60 wt % to 97 wt % and most preferably from about 80 wt % to 95 wt % of the lubricating oil composition. (When weight percent is used herein, it is referring to weight percent of the lubricating oil unless otherwise specified.)

The overbased alkali metal alkylhydroxybenzoate produced by the process of the present invention in the lubricating oil composition will be in a minor amount compared to the base oil of lubricating viscosity. Generally, it will be in an amount from about 1 wt % to 25 wt %, preferably from about 2 wt % to 12 wt % and more preferably from about 3 wt % to 8 wt %, based on the total weight of the lubricating oil composition.

Other Additive Components

The following additive components are examples of components that can be favorably employed in combination with the lubricating additive of the present invention. These examples of additives are provided to illustrate the present invention, but they are not intended to limit it.

(A) Ashless Dispersants: alkenyl succinimides, alkenyl succinimides modified with other organic compounds, and alkenyl succinimides modified with boric acid, alkenyl succinic ester.

(B) Oxidation Inhibitors:

1) Phenol type phenolic) oxidation inhibitors: 4,4'-methylenebis(2,6-di-tert-butylphenol), 4,4'-bis(2,6-di-tert-butylphenol), 4,4'-bis(2-methyl-6-tert-butylphenol), 2,2'-(methylenebis(4-methyl-6-tert-butyl-phenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidene-bis(4,6-dimethylphenol), 2,2'-methylenebis(4-methyl-6-cyclohexylphenol), 2,6-di-tert-butyl-4-methylphenol, 2,6-di-tert-butyl-4-ethylphenol, 2,4-dimethyl-6-tert-butyl-phenol, 2,6-di-tert-α-dimethylamino-p-cresol, 2,6-di-tert-4(N,N' dimethylaminomethylphenol), 4,4'-thiobis(2-methyl-6-tert-butylphenol), 2,2'-thiobis(4-methyl-6-tert-butylphenol), bis(3-methyl-4-hydroxy-5-tert-butylbenzyl)-sulfide, and bis(3,5-di-tert-butyl-4-hydroxybenzyl).

2) Diphenylamine type oxidation inhibitor: alkylated diphenylamine, phenyl-α-naphthylamine, and alkylated α-naphthylamine.

3) Other types: metal dithiocarbamate (e.g., zinc dithiocarbamate), and methylenebis(dibutyldithiocarbamate).

(C) Rust Inhibitors (Anti-Rust agents):

1) Non ionic polyoxyethylene surface active agents: polyoxyethylene lauryl ether, polyoxyethylene higher alcohol ether, polyoxyethylene nonylphenyl ether, polyoxyethylene octylphenyl ether, polyoxyethylene octyl stearyl ether, polyoxyethylene oleyl ether, polyoxyethylene sorbitol monostearate, polyoxyethylene sorbitol mono-oleate, and polyethylene glycol monooleate.

2) Other compounds: stearic acid and other fatty acids, dicarboxylic acids, metal soaps, fatty acid amine salts, metal salts of heavy sulfonic acid, partial carboxylic acid ester of polyhydric alcohol, and phosphoric ester.

(D) Demulsifiers: addition product of alkylphenol and ethyleneoxide, polyoxyethylene alkyl ether, and polyoxyethylene sorbitane ester.

(E) Extreme Pressure Agents (EP agents): zinc dialkyldithiophosphate (Zn-DTP, primary alkyl type & secondary alkyl type), sulfurized oils, diphenyl sulfide, methyl trichlorostearate, chlorinated naphthalene, benzyl iodide, fluoroalkylpolysiloxane, and lead naphthenate.

(F) Friction Modifiers: fatty alcohol, fatty acid, amine, borated ester, and other esters (G) Multifunctional Additives: sulfurized oxymolybdenum dithiocarbamate, sulfurized oxymolybdenum organo phosphorodithioate, oxymolybdenum monoglyceride, oxymolybdenum diethylate amide, amine-molybdenum complex compound, and sulfur-containing molybdenum complex compound (H) Viscosity Index Improvers: polymethacrylate type polymers, ethylene-propylene copolymers, styrene-isoprene copolymers, hydrated styrene-isoprene copolymers, polyisobutylene, and dispersant type viscosity index improvers.

(I) Pour-point Depressants: polymethyl methacrylate.

(K) Foam Inhibitors: alkyl methacrylate polymers and dimethyl silicone polymers.

(L) Metal Detergents: sulfurized or unsulfurized alkyl or alkenyl phenates, alkyl or alkenyl aromatic sulfonates, calcium sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multi-acid, and chemical and physical mixtures thereof.

EXAMPLES

The invention will be further illustrated by the following examples, which set forth particularly advantageous method embodiments. While the Examples are provided to illustrate the present invention, they are not intended to limit it Example 1

A) Formation of the Alkali Metal Base Alkylphenate

Alkylphenols (1000 g) prepared from mixtures of linear normal alpha olefins ($C_{20}$-$C_{28}$ alpha olefins from Chevron Phillips Chemical Company), xylene (500 g) was placed in a reactor and heated to 60° C. over a period of 15 minutes then 290 g of an aqueous solution at 45% KOH (2.325 mole) and 0.2 g of a defoamer called Rhodorsil 47V300 (available from Rhodia) were added. The reactor was then heated further to 145° C. over a period of 2 hours while gradually decreasing the pressure from atmospheric pressure (1013 mbar absolute—$1\times10^5$ Pa) to 800 mbar absolute ($8\times10^4$ Pa). Under these conditions, reflux begins and was maintained for 3 hours. During this period, approximately 179 ml of water was removed.

B) Carboxylation

The reactor containing the alkali metal alkylphenate from step A) was allowed to cool to 140° C. The reactor was then pressurized with $CO_2$ at 4 bar ($4\times10^5$ Pa) (absolute pressure) and maintained under these conditions for 4 hours. At the end of this period, $CO_2$ was vacated to allow the reactor to reach atmospheric pressure. At this step, 82 g of $CO_2$ was incorporated.

The material was cooled down at 80° C. and 1500 g of xylene was added. A total quantity of 3045 g of potassium alkylhydroxybenzoate diluted in xylene was obtained.

C) Overbasing 1418 g of the alkali metal alkylhydroxybenzoate from step B) were loaded under agitation into a reactor over 10 minutes period. Then, a slurry of methanol (239 g), lime (239 g) and xylene (407 g) was introduced. Once the slurry was added, a mixture of formic acid (5.4 g):acetic acid (5.4 g) was added and allowed to react with the contents in the reactor. The reactor was heated to 30° C. over a period of 15 minutes. Once the temperature of the reactor had heated at 30° C., $CO_2$ (129 g) was introduced into the reactor while the temperature increased up to 60° C. over a period of 170 minutes. The reaction yielded, a potassium alkylhydroxybenzoate overbased with calcium carbonate.

The percentage of crude sediment (1.6 volume %) was determined at this step following the ASTM D2273 method.

D) Predistillation, Centrifugation, and Final Distillation

The mixture contained within the reactor was taken in stages to a temperature between 65° to 128° over a period of 110 minutes. This procedure removed methanol, water and a portion of the xylene. Once 128° C. was reached, diluent oil (366 g) was added. Crude sediment was then measured. The amount of crude sediment in the overbased alkali metal alkylhydroxybenzoate was very low (1.2 volume %).

The reaction mixture was centrifuged to remove crude sediment and then distilled at 204° C. for 10 minutes under vacuum at 50 mbar absolute ($50\times10^2$ Pa) to remove the remaining xylene.

Loads are in Table II and analyses in Table III.

Example 2

Example 2 was prepared as described in Example 1 but two slurries are introduced at overbasing step (step C).

C) Overbasing 1418 g of the alkali metal alkylhydroxybenzoate from step B) was loaded under agitation into a reactor over 10 minutes period.

Then a slurry of methanol (239 g), lime (239 g) and xylene (407 g) was introduced, once the slurry was added, a mixture of formic acid (7 g):acetic acid (7 g) was added and allowed to react with the contents in the reactor.

The reactor was heated up to 30° C. over a period of 15 minutes. Once the temperature of the reactor had reached 30° C., $CO_2$ (111 g) was introduced into the reactor over a period of 140 minutes then an additional slurry of methanol (52 g), lime (52 g) and xylene (126 g) was introduced and an extra quantity of $CO_2$ (41 g) was introduced into the reactor over a period of 47 minutes.

The reaction yielded a potassium alkylhydroxybenzoate overbased with calcium carbonate. The percentage of crude sediment (1.4 volume %) was determined at this step following the ASTM D2273 method.

D) Predistillation, Centrifugation, and Final Distillation:

Same as Example 1 but 423 g diluent oil is added instead of 366 g.

Loads are in Table II and analyses in Table III.

Example 3

Example 3 was prepared as described in Example 2 but a higher TBN (TBN=400) is targeted so a little bit more lime and $CO_2$ are added at the second slurry.

Loads are in Table II and analyses in Table III.

Example 4

Example 4 was prepared as described in Example 2, but at overbasing step (step C), there is a change in the order of addition of the acid and slurry. In Examples 1, 2 and 3, the slurry (lime-methanol-slurry) is loaded first then the mixture formic acid:acetic acid. However, in Example 4, the mixture of formic acid:acetic acid is loaded first in order to eliminate the main part of potassium carbonate obtained at carboxylate part and then the slurry (lime-methanol-xylene).

Loads are in Table II and analyses in Table III.

Example 5

Example 5 was prepared as described in Example 1 except a directionally higher quantity of formic acid:acetic acid is added in step C) and a significant lower quantity of diluent oil is used in step D). As a consequence TBN and viscosity are higher.

Same process as Example 1 but there is a change in the order of addition at overbasing step.

In Example 1, the slurry is loaded before the mixture formic acid:acetic acid.

In Example 5, the mixture formic acid:/acetic acid is loaded first.

Loads are in Table II and analyses in Table III.

Comparative Example A

Loads, similar as example 2 except the loading of formic:acetic acid is omitted. Incorporation of lime is poorer, so % crude sediment is much higher 12% instead of 1.4%. At a so high percentage of crude sediment, the waste is too high to obtain a commercial material.

TABLE II

| LOADS | 1 | 2 | 3 | 4 | 5 | Comparative Example. A |
|---|---|---|---|---|---|---|
| A. Neutralization Step Linear Alkylphenols | | | | | | |
| -CPC $C_{20}$-$C_{28}$ Olefin (g) | 1000 | 1000 | 1000 | 1000 | 1000 | 1000 |
| -CPC $C_{20}$-$C_{28}$ Olefin (mole) | 2.32 | 2.32 | 2.32 | 2.32 | 2.32 | 2.32 |
| KOH/Alkylphenol Molar Ratio (g) | 1 | 1 | 1 | 1 | 1 | 1 |
| Xylene (g) | 500 | 500 | 500 | 500 | 500 | 500 |
| KOH (diluted at 45% water) (mole) | 2.32 | 2.32 | 2.32 | 2.32 | 2.32 | 2.32 |
| KOH (diluted at 45% water) (g) | 290 | 290 | 290 | 290 | 290 | 290 |
| Water eliminated (g) | 199 | 199 | 199 | 199 | 199 | 199 |
| B. Carboxylation $CO_2$ (g) | 82 | 82 | 82 | 82 | 82 | 82 |
| Xylene end carbonxylation (g) | 1500 | 1500 | 1500 | 1500 | 1500 | 1500 |
| Total K hydroxybenzoate + xylene | 3045 | 3045 | 3045 | 3045 | 3045 | 3045 |
| C. Overbasing step | | | | | | |
| K hydroxybenzoate (from step B) | 1418 | 1418 | 1418 | 1418 | 1418 | 1418 |
| First Slurry | | | | | | |
| Xylene (g) | 407 | 407 | 407 | 407 | 407 | 407 |
| Methanol (g) | 239 | 239 | 239 | 239 | 239 | 239 |
| Lime (g) | 239 | 239 | 239 | 239 | 239 | 239 |
| Formic acid (g) | 5.4 | 7 | 7 | 7 | 7 | 0 |
| Acetic acid (g) | 5.4 | 7 | 7 | 7 | 7 | 0 |
| $CO_2$ (g) | 129 | 111 | 111 | 111 | 126 | 111 |
| Second Slurry | | | | | | |
| Xylene (g) | 0 | 126 | 204 | 126 | 0 | 126 |
| Methanol (g) | 0 | 52 | 104 | 52 | 0 | 52 |
| Lime (g) | 0 | 52 | 104 | 52 | 0 | 52 |
| $CO_2$ (g) | 0 | 41 | 69 | 41 | 0 | 41 |
| Diluent oil (g) | 366 | 423 | 423 | 423 | 250 | 423 |
| % Sed (vol) ASTM D2270 | 1.2 | 1.4 | 1.6 | 1.4 | 1.2 | 12 |

TABLE III

| ANALYSIS[a] | 1 | 2 | 3 | 4 | 5 | Comparative Example A |
|---|---|---|---|---|---|---|
| AA/AF before lime | | | | YES | YES | NO |
| Lime before AA/AF | YES | YES | YES | | | NO |
| CaT (w %) | 9.94 | 11.58 | 13.15 | 12.01 | 11.3 | 10.8 |
| BN ASTM D2896 (mg KOH/g) | 318 | 364 | 401 | 362 | 361 | 342 |
| Visco (100° C.) ASTL D 445 | 98.8 | 158 | 353 | 245 | 502 | 120 |
| Visco (100° C.) at BN 350 | | | | | 283 | |
| K (% vol) | 3.11 | 2.79 | 2.63 | 2.71 | 3.11 | 2.64 |
| Dialysis | | | | | | |
| Carboxylate (% vol) | 29.7 | 28.2 | 26.8 | 27.5 | 32.5 | 30.2 |
| Alkylphenate (% vol) | 3.9 | 4.4 | 4.5 | 5.5 | 5.1 | 6.9 |
| CaCO3 (% vol) | 27.4 | 30.3 | 34.3 | 31.2 | 29.7 | 28.7 |
| Diluent oil (% vol) | 33 | 33.8 | 31.5 | 32.5 | 28.3 | 31.2 |
| Unreacted AP (% vol) | 6 | 3.3 | 2.9 | 3.3 | 4.4 | 3.0 |
| % Carboxy/BN × 100 | 9.3 | 7.75 | 6.75 | 7.6 | 9 | |
| BSD performances (GV) mg deposit | 19.2 | | 77.7 | 24.2 | 30/42 | |

[a]Analytical methods utilized

A—Neutralization Step

Conversion % alkylphenols

In a first step, the product obtained at the end of step A is dialyzed through a membrane: the salified material stays inside the membrane and after elimination of the solvent, it is weighted (M1).

Xylene and the unreacted alkylphenol move through the membrane xylene and the solvents utilized are eliminated by vaporization, a weight M2 is obtained.

$$\% \text{ Conversion} = \frac{M1}{M1 + M2} \times 100.$$

B. Carboxylation Step

The product obtained at the end of step B is acidified by hydrochloric acid, it is titrated by tetra-n-butylammonium hydroxide.

Three inflexions points are observed:

First one V1 corresponds to hydroxybenzoic acid

Second one V2 corresponds to hydroxybenzoic acid+dicarboxylic acid

Third one V3 corresponds to alkylphenols+alkylphenate

V1, V2, V3 are expressed in mg KOH/g of product.

Composition through Dialysis

The method is the following:

1°) Dialysis of the Final Material

A "residue" (salified part) stays inside the membrane

Dialysate: non salified part (unreacted alkylphenol and diluent oil) moves through the membrane 2°) Analysis of Residue It contained calcium carbonate, Ca phenate and Ca hydroxybenzoate. After elimination of solvent, the residue is weighted. After acidification, the quantity of phenate and hydroxybenzoate are determined through a potentiometric method.

Determination of calcium carbonate. A known quantity of final product is acidified, the organic phase contains hydroxybenzoic acid and alkylphenol. After elimination of solvent (of this organic phase), the quantity of calcium carbonate is obtained by difference: weight of starting sample minus weight of this organic phase after elimination of solvent and correction.

3°) Analysis of Dialysate

Diluent oil and alkylphenols go through a silica column to separate alkylphenols and diluent oil. Quantity of alkylphenols is determined by difference of weight.

What is claimed is:

1. A process for preparing an overbased alkali metal alkylhydroxybenzoate, said process comprising overbasing an alkali metal alkylhydroxybenzoate or a mixture of alkali metal alkylhydroxybenzoate and up to 50 mole % of alkylphenol, based on the total mixture of alkylhydroxybenzoate and alkylphenol, with a molar excess of alkaline earth metal base and at least one acidic overbasing material in the presence of a mixture of carboxylic acids selected from $C_1$ to $C_4$ carboxylic acids having from one to four carbon atoms and a solvent selected from the group consisting of aromatic hydrocarbons, aliphatic hydrocarbons, monoalcohols, and mixtures thereof, and further wherein the process results in an overbased alkali metal alkylhydroxybenzoate having less than 3 volume % crude sediment in the absence of a filtration step.

2. The process according to claim 1, wherein the process is carried out in the absence of sulfur.

3. The process according to claim 1, wherein the process results in an overbased alkali metal alkylhydroxybenzoate having less than 2 volume % crude sediment.

4. The process according to claim 1, wherein the process results in an overbased alkali metal alkylhydroxybenzoate having less than 1 volume % crude sediment.

5. The process according to claim 1, wherein the overbased alkali earth metal alkylhydroxybenzoate has a TBN from about 250 to 450.

6. The process according to claim 5, wherein the overbased alkali earth metal alkylhydroxybenzoate has a TBN from about 300 to 400.

7. The process according to claim 1, wherein the overbased alkali metal alkylhydroxybenzoate has a TBN from about 100 to 250.

8. The process according to claim 7, wherein the overbased alkali metal alkylhydroxybenzoate has a TBN from about 140 to 230.

9. The process according to claim 1, wherein the alkali metal is potassium or sodium.

10. The process according to claim 9, wherein the alkali metal is potassium.

11. The process according to claim 1, wherein the alkyl group of the alkylphenol is a linear or branched alkyl or a mixture of linear and branched alkyl groups.

12. The process according to claim 11, wherein the alkyl group of the alkylphenol is a linear alkyl group having from about 12 to 40 carbon atoms.

13. The process according to claim 12, wherein the alkyl group of the alkylphenol is a linear alkyl group having from about 12 to 40 carbon atoms derived from the polymerization of ethylene.

14. The process according to claim 13, wherein the alkyl group of the alkylphenol is a linear alkyl group having from about 18 to 30 carbon atoms.

15. The process according to claim 1, wherein the alkyl group of the alkylphenol is a branched alkyl group having at least 9 carbon atoms.

16. The process according to claim 15, wherein the alkyl group of the alkylphenol is a branched alkyl group having from about 9 to 40 carbon atoms.

17. The process according to claim 16, wherein the alkyl group of the alkylphenol is a branched alkyl group having from about 9 to 24 carbon atoms.

18. The process according to claim 1, wherein the alkyl group of the alkylphenol is selected from the group consisting of $C_{14}$-$C_{16}$, $C_{16}$-$C_{18}$, $C_{18}$-$C_{30}$, $C_{20}$-$C_{22}$, $C_{20}$-$C_{24}$, $C_{20}$-$C_{26}$ and $C_{20}$-$C_{28}$ alkyl and mixtures thereof, and is derived from normal alpha olefins.

19. The process according to claim 11, wherein the alkyl group of the alkylphenol is a mixture of linear alkyl having from about 20 to 30 carbon atoms and branched alkyl containing about 12 carbon atoms.

20. The process according to claim 1, wherein the alkylphenol is up to 25 mole % of the total mixture of alkali metal alkylhydroxybenzoate and alkylphenol.

21. The process according to claim 20, wherein the alkylphenol is up to 15 mole % of the total mixture of alkali metal alkylhydroxybenzoate and alkylphenol.

22. The process according to claim 1, wherein the acidic overbasing material is carbon dioxide.

23. The process according to claim 1, wherein the mixture of carboxylic acids is selected from the group consisting of acetic acid, formic acid, propionic acid, and butyric acid.

24. The process according to claim 1, wherein the mixture of carboxylic acids is a mixture of formic acid and acetic acid.

25. The process according to claim 24, wherein the mixture of formic acid and acetic acid is in a weight ratio from about 0.1:1 to 100:1, formic to acetic acid.

26. The process according to claim 25, wherein the mixture of formic acid and acetic acid is in a weight ratio from about 0.5:1 to 4:1, formic to acetic acid.

27. The process according to claim 26, wherein the mixture of formic acid and acetic acid is in a weight ratio of from about 0.5:1 to 2:1, formic to acidic acid.

28. The process according to claim 27, wherein the mixture of formic acid and acetic acid is in a weight ratio of about 1:1.

29. The process according to claim 1, wherein the solvent is selected from the group consisting of xylene, methanol, toluene, cyclohexane, 2-ethylhexanol, and mixtures thereof.

30. The process according to claim 29, wherein the solvent is xylene, methanol, 2-ethylhexanol or mixtures thereof.

31. The process according to claim 30, wherein the solvent is a mixture of xylene and methanol.

32. A product produced by the process of claim 1.

33. A process for preparing an overbased alkali metal alkylhydroxybenzoate, said process comprising: a) reacting alkylphenol with an alkali metal base to produce an alkali metal alkylphenate; b) carboxylating the alkali metal alkylphenate obtained in step a) with carbon dioxide so that at least 50 mole % of the starting alkylphenol has been converted to an alkali metal alkylhydroxybenzoate; c) contacting the alkali metal alkylhydroxybenzoate in step b) with a mixture of carboxylic acids selected from $C_1$ to $C_4$ carboxylic acids; and d) overbasing the mixture of the alkali metal alkylhydroxybenzoate and the mixture of carboxylic acids from step c) with a molar excess of alkaline earth metal base and at least one acidic overbasing material in the presence of a solvent selected from the group consisting of aromatic hydrocarbons, aliphatic hydrocarbons, monoalcohols, and mixtures thereof, and further wherein the process results in an overbased alkali metal alkylhydroxybenzoate having less than 3 volume % crude sediment in the absence of a filtration step.

34. The process of claim 33, further comprising eliminating the excess solvents and crude sediments.

35. The process according to claim 33, wherein the process is carried out in the absence of sulfur.

36. The process according to claim 33, wherein the process results in an overbased alkali metal alkylhydroxybenzoate having less than 2 volume % crude sediment.

37. The process according to claim 33, wherein the process results in an overbased alkali metal alkylhydroxybenzoate having less than 1 volume % crude sediment.

38. The process according to claim 33, wherein the overbased alkali metal alkylhydroxybenzoate has a TBN from about 250 to 450.

39. The process according to claim 38, wherein the overbased alkali metal alkylhydroxybenzoate has a TBN from about 300 to 400.

40. The process according to claim 33, wherein the overbased alkali metal alkylhydroxybenzoate has a TBN from about 100 to 250.

41. The process according to claim 40, wherein the overbased alkali metal alkylhydroxybenzoate has a TBN from about 140 to 230.

42. The process according to claim 33, wherein the alkali metal base is potassium or sodium.

43. The process according to claim 42, wherein the alkali metal is potassium.

44. The process according to claim 33, wherein the alkyl group of the alkylphenol is a linear or branched alkyl or a mixture of linear and branched alkyl groups.

45. The process according to claim 44, wherein the alkyl group of the alkylphenol is a linear alkyl group having from about 12 to 40 carbon atoms.

46. The process according to claim 45, wherein the alkyl group of the alkylphenol is a linear alkyl group having from about 12 to 40 carbon atoms and derived from the polymerization of ethylene.

47. The process according to claim 46, wherein the alkyl group of the alkylphenol is a linear alkyl group having from about 18 to 30 carbon atoms.

48. The process according to claim 33, wherein the alkyl group of the alkylphenol is a branched alkyl group having at least 9 carbon atoms.

49. The process according to claim 48, wherein the alkyl group of the alkylphenol is a branched alkyl group having from about 9 to 40 carbon atoms.

50. The process according to claim 49, wherein the alkyl group of the alkylphenol is a branched alkyl group having from about 9 to 24 carbon atoms.

51. The process according to claim 50, wherein the alkyl group of the alkylphenol is selected from the group consisting of $C_{14}$-$C_{16}$, $C_{16}$-$C_{18}$, $C_{18}$-$C_{30}$, $C_{20}$-$C_{22}$, $C_{20}$-$C_{24}$, $C_{20}$-$C_{26}$ and $C_{20}$-$C_{28}$ alkyl and mixtures thereof, and is derived from normal alpha olefins.

52. The process according to claim 44, wherein the alkyl group of the alkylphenol is a mixture of linear alkyl having from about 20 to 30 carbon atoms and branched alkyl containing about 12 carbon atoms.

53. The process according to claim 33, wherein the alkylphenol is up to 25 mole % of the total mixture of alkali metal alkylhydroxybenzoate and alkylphenol.

54. The process according to claim 53, wherein the alkylphenol is up to 15 mole % of the total mixture of alkali metal alkylhydroxybenzoate and alkylphenol.

55. The process according to claim 33, wherein the acidic overbasing material is carbon dioxide.

56. The process according to claim 33, wherein the mixture of carboxylic acids is selected from the group consisting of acetic acid, formic acid, propionic acid, and butyric acid.

57. The process according to claim 33, wherein the mixture of carboxylic acids is a mixture of formic acid and acetic acid.

58. The process according to claim 57, wherein the mixture of formic acid and acetic acid is in a weight ratio from about 0.1:1 to 100:1, formic to acetic acid.

59. The process according to claim 58, wherein the mixture of formic acid and acetic acid is in a weight ratio from about 0.5:1 to 4:1, formic to acetic acid.

60. The process according to claim 59, wherein the mixture of formic acid and acetic acid is in a weight ratio of from about 0.5:1 to 2:1, formic to acetic acid.

61. The process according to claim 60, wherein the mixture of formic acid and acetic acid is in a weight ratio of about 1:1.

62. The process according to claim 33, wherein the solvent is selected from the group consisting of xylene, methanol, toluene, cyclohexane, 2-ethylhexanol, and mixtures thereof.

63. The process according to claim 62, wherein the solvent is xylene, methanol, 2-ethylhexanol, or mixtures thereof.

64. The process according to claim 63, wherein the solvent is a mixture of xylene and methanol.

65. A product produced by the process of claim 33.

66. A process for preparing an overbased alkali metal alkylhydroxybenzoate, said process comprising: a) reacting alkylphenol with an alkali metal base to produce an alkali metal alkylphenate; b) carboxylating the alkali metal alkylphenate obtained in step a) with carbon dioxide so that at least 50 mole % of the starting alkylphenol has been converted to an alkali metal alkylhydroxybenzoate; c) contacting the alkali metal alkylhydroxybenzoate with a molar excess of alkaline earth metal base and a solvent selected from the group consisting of aromatic hydrocarbons, aliphatic hydrocarbons, monoalcohols and mixtures thereof; d) contacting the mixture of alkali metal alkylhydroxybenzoate and molar excess of alkaline earth metal base and the solvent from step c) with a mixture of carboxylic acids selected from $C_1$ to $C_4$ carboxylic acids; and e) overbasing the mixture of alkali metal alkylhydroxybenzoate, the molar excess of alkaline earth metal base, the solvent and the mixture of carboxylic acids from step d) with an acidic overbasing material, and further wherein the process results in an overbased alkali metal alkylhydroxybenzoate having less than 3 volume % crude sediment in the absence of a filtration step.

67. The process of claim 66, further comprising eliminating the excess solvents and crude sediments.

68. The process according to claim 66, wherein the process is carried out in the absence of sulfur.

69. The process according to claim 66, wherein the process results in an overbased alkali metal alkylhydroxybenzoate having less than 2 volume % crude sediment.

70. The process according to claim 66, wherein the process results in an overbased alkali metal alkylhydroxybenzoate having less than 1 volume % crude sediment.

71. The process according to claim 66, wherein the overbased alkali metal alkylhydroxybenzoate has a TBN from about 250 to 450.

72. The process according to claims 71 wherein the overbased alkaline earth metal alkylhydroxybenzoate has a TBN from about 300 to 400.

73. The process according to claims 66, wherein the overbased alkali metal alkylhydroxybenzoate has a TBN from about 100 to 250.

74. The process according to claims 73, wherein the overbased alkali metal alkylhydroxybenzoate has a TBN from about 140 to 230.

75. The process according to claim 66, wherein the alkali metal is potassium or sodium.

76. The process according to claim 75, wherein the alkali metal is potassium.

77. The process according to claim 66, wherein the alkyl group of the alkylphenol is a linear or branched alkyl or a mixture of linear and branched alkyl groups.

78. The process according to claim 77, wherein the alkyl group of the alkylphenol is a linear alkyl group having from about 12 to 40 carbon atoms.

79. The process according to claim 78, wherein the alkyl group of the alkylphenol is a linear alkyl group having from about 12 to 40 carbon atoms and derived from the polymerization of ethylene.

80. The process according to claim 79, wherein the alkyl group of the alkylphenol is a linear alkyl group having from about 18 to 30 carbon atoms.

81. The process according to claim 66, wherein the alkyl group of the alkylphenol is a branched alkyl group having at least 9 carbon atoms.

82. The process according to claim 81, wherein the alkyl group of the alkylphenol is a branched alkyl group having from about 9 to 40 carbon atoms.

83. The process according to claim 82, wherein the alkyl group of the alkylphenol is a branched alkyl group having from about 9 to 24 carbon atoms.

84. The process according to claim 66, wherein the alkyl group of the alkylphenol is selected from the group consisting of $C_{14}$-$C_{16}$, $C_{16}$-$C_{18}$, $C_{18}$-$C_{30}$, $C_{20}$-$C_{22}$, $C_{20}$-$C_{24}$, $C_{20}$-$C_{26}$ and $C_{20}$-$C_{28}$ alkyl and mixtures thereof, and derived from normal alpha olefins.

85. The process according to claim 79, wherein the alkyl group of the alkylphenol is a mixture of linear alkyl having from about 20 to 30 carbon atoms and branched alkyl containing about 12 carbon atoms.

86. The process according to claim 66, wherein the alkylphenol is up to 25 mole % of the total mixture of alkali metal alkylhydroxybenzoate and alkylphenol.

87. The process according to claim 86, wherein the alkylphenol is up to 15 mole % of the total mixture of alkali metal alkylhydroxybenzoate and alkylphenol.

88. The process according to claim 66, wherein the acidic overbasing material is carbon dioxide.

89. The process according to claim 66, wherein the mixture of carboxylic acids is selected from the group consisting of acetic acid, formic acid, propionic acid, and butyric acid.

90. The process according to claim 66, wherein the mixture of carboxylic acids is a mixture of formic acid and acetic acid.

91. The process according to claim 90, wherein the mixture of formic acid and acetic acid is in a weight ratio from about 0.1:1 to 100:1, formic to acetic acid.

92. The process according to claim 91, wherein the mixture of formic acid and acetic acid is in a weight ratio from about 0.5:1 to 4:1, formic to acetic acid.

93. The process according to claim 92, wherein the mixture of formic acid and acetic acid is in a weight ratio of from about 0.5:1 to 2:1, formic to acetic acid.

94. The process according to claim 93, wherein the mixture of formic acid and acetic acid is in a weight ratio of from about 1:1.

95. The process according to claim 66, wherein the solvent is selected from the group consisting of xylene, methanol, toluene, cyclohexane, 2-ethylhexanol, and mixtures thereof.

96. The process according to claim 95, wherein the solvent is xylene, methanol, 2-ethylhexanol or mixtures thereof.

97. The process according to claim 96, wherein the solvent is a mixture of xylene and methanol.

98. A product produced by the process of claim 66.

99. A lubricating oil composition comprising a major amount of a base oil of lubricating viscosity and a minor amount of an overbased alkali metal alkylhydroxylbenzoate produced by the process comprising overbasing an alkali metal alkylhydroxybenzoate or a mixture of alkali metal alkylhydroxybenzoate and up to 50 mole % of alkylphenol, based on the total mixture of alkylhydroxylbenzoate, with a molar excess of alkaline earth metal base and at least one acidic overbasing material in the presence of a mixture of carboxylic acids selected from $C_1$ to $C_4$ carboxylic acids and a solvent selected from the group consisting of aromatic hydrocarbons, aliphatic hydrocarbons and monoalcohols and further wherein the process results in an overbased alkali metal alkylhydroxybenzoate having less than 3 volume % crude sediment in the absence of a filtration step.

100. A lubricating oil composition comprising a major amount of a base oil of lubricating viscosity and a minor amount of an overbased alkali metal alkylhydroxybenzoate produced by the process comprising: a) reacting alkylphenol with an alkali metal base to produce an alkali metal alkylphenate; b) carboxylating the alkali metal alkylphenate obtained in step a) with carbon dioxide so that at least 50 mole % of the starting alkylphenol has been converted to an alkali metal alkylhydroxybenzoate; c) contacting the alkali metal alkylhydroxybenzoate in step b) with a mixture of carboxylic acids selected from $C_1$ to $C_4$ carboxylic acids; and d) overbasing the mixture of the alkali metal alkylhydroxybenzoate and the mixture of carboxylic acids from step c) with a molar excess of alkaline earth metal base and at least one acidic overbasing material in the presence of a solvent selected from the group consisting of aromatic hydrocarbons, aliphatic hydrocarbons, monoalcohols, and mixtures thereof, and further wherein the process results in an overbased alkali metal alkylhydroxybenzoate having less than 3 volume % crude sediment in the absence of a filtration step.

101. A lubricating oil composition comprising a major amount of a base oil of lubricating viscosity and a minor amount of an overbased alkali metal alkylhydroxybenzoate produced by the process comprising: a) reacting alkylphenol with an alkali metal base to produce an alkali metal alkylphenate; b) carboxylating the alkali metal alkylphenate obtained in step a) with carbon dioxide so that at least 50 mole % of the starting alkylphenol has been converted to an alkali metal alkylhydroxybenzoate; c) contacting the alkali metal alkylhydroxybenzoate with a molar excess of alkaline earth metal base and a solvent selected from the group consisting of aromatic hydrocarbons, aliphatic hydrocarbons, monoalcohols, and mixtures thereof; d) contacting the mixture of alkali metal alkylhydroxybenzoate and molar excess of alkaline earth metal base and the solvent from step c) with a mixture of carboxylic acids selected from $C_1$ to $C_4$ carboxylic acids; and e) overbasing the mixture of alkali metal alkylhydroxybenzoate, the molar excess of alkaline earth metal base, the solvent and the mixture of carboxylic acids from step d) with an acidic overbasing material, and further wherein the process results in an overbased alkali metal alkylhydroxybenzoate having less than 3 volume % crude sediment in the absence of a filtration step.

102. The lubricating oil composition according to claim 99, wherein the mixture of carboxylic acids is a mixture of formic acid and acetic acid.

103. The lubricating oil composition according to claim 100, wherein the mixture of carboxylic acids is a mixture of formic acid and acetic acid.

104. The lubricating oil composition according to claim 101, wherein the mixture of carboxylic acids is a mixture of formic acid and acetic acid.

\* \* \* \* \*